(12) United States Patent
Chang et al.

(10) Patent No.: US 8,588,205 B2
(45) Date of Patent: Nov. 19, 2013

(54) UPLINK POWER CONTROL MESSAGE INDEXING IN WIRELESS OFDMA SYSTEMS

(75) Inventors: Yu-Hao Chang, Daya Township, Taichung County (TW); Yih-Shen Chen, Hsinchu (TW)

(73) Assignee: Mediatek Inc. (TW)

( * ) Notice: Subject to any disclaimer, the term of this patent is extended or adjusted under 35 U.S.C. 154(b) by 470 days.

(21) Appl. No.: 12/924,676

(22) Filed: Sep. 30, 2010

(65) Prior Publication Data
US 2011/0199945 A1 Aug. 18, 2011

Related U.S. Application Data

(60) Provisional application No. 61/303,719, filed on Feb. 12, 2010.

(51) Int. Cl.
| H04B 7/216 | (2006.01) |
| H04B 7/208 | (2006.01) |
| H04B 7/185 | (2006.01) |
| H04L 27/28 | (2006.01) |

(52) U.S. Cl.
USPC ........... 370/344; 370/342; 455/13.4; 375/260

(58) Field of Classification Search
USPC ............. 370/328–330, 335–336, 342–347; 375/260–265, 146–153, 219–220, 375/300–301, 316–339; 455/17, 13.4, 455/59–61, 102–104
See application file for complete search history.

(56) References Cited

U.S. PATENT DOCUMENTS

| 7,558,535 B2 | 7/2009 | Cho et al. .......................... 455/69 |
| 2007/0077956 A1 | 4/2007 | Julian et al. .................... 455/522 |
| 2007/0098093 A1 | 5/2007 | Kwon et al. .................. 375/260 |

(Continued)

FOREIGN PATENT DOCUMENTS

| CN | 101044700 A | 8/2004 |
| CN | 101253709 A | 8/2008 |
| CN | 101502027 A | 8/2009 |
| WO | WO 2007024851 A2 | 3/2007 |

OTHER PUBLICATIONS

International Search Report and Written Opinion of International Search Authority for PCT/CN2010/079926 dated Mar. 24, 2011 (9 pages).

(Continued)

*Primary Examiner* — Thai Hoang
(74) *Attorney, Agent, or Firm* — Imperium Patent Works; Zheng Jin

(57) ABSTRACT

A method of power control message indexing is provided in a wireless Orthogonal Frequency Division Multiple Access (OFDMA) network. A base station configures fast feedback channels (FFBCHs) and mobile stations report downlink channel information via the configured FFBCHs. Based on the received channel information, the base station estimates uplink channel quality and detects any channel variation. In response to uplink channel variation, the base station delivers power offsets to adjust the transmit power levels of the mobile stations. In one advantageous aspect, the power control commands for mobile stations are aggregated and the indexing scheme of the power control commands is implicitly based on the configured FFBCHs. For example, if a FFBCH is located at a first location in an uplink frame, then a following power control command in response to the FFBCH is located at a second location in a downlink frame, the second location is located after the first location with a predefined fixed delay time.

18 Claims, 4 Drawing Sheets

(56) References Cited

U.S. PATENT DOCUMENTS

| | | | |
|---|---|---|---|
| 2008/0031172 A1* | 2/2008 | Nanda et al. | 370/310.1 |
| 2008/0108379 A1* | 5/2008 | Cho et al. | 455/522 |
| 2008/0167040 A1 | 7/2008 | Khandekar et al. | 455/436 |
| 2008/0227476 A1 | 9/2008 | Cho et al. | 455/522 |
| 2008/0298315 A1* | 12/2008 | Ihm et al. | 370/329 |
| 2009/0262670 A1 | 10/2009 | Cho et al. | 370/280 |
| 2010/0067465 A1* | 3/2010 | Miki et al. | 370/329 |
| 2011/0044223 A1* | 2/2011 | Kim et al. | 370/312 |
| 2011/0081927 A1* | 4/2011 | Gerstenberger et al. | 455/506 |
| 2011/0319116 A1* | 12/2011 | Iwamura et al. | 455/517 |
| 2012/0002568 A1* | 1/2012 | Tiirola et al. | 370/252 |
| 2012/0044953 A1* | 2/2012 | Kishigami et al. | 370/464 |
| 2012/0063381 A1* | 3/2012 | Huang et al. | 370/312 |
| 2012/0188966 A1* | 7/2012 | Nishio | 370/329 |
| 2012/0263068 A1* | 10/2012 | Morimoto et al. | 370/252 |

OTHER PUBLICATIONS

Park et al., "Text Proposal of PC-A-Map IE Assignment in IEEE 802.16 D3," IEEE C802.16m-09/2859, Dec. 30, 2009.

SIPO, Examination Report of Chinese patent application 201080002988.5 dated Apr. 22, 2013 (4 pages).

IEEE Std 802.16™—2009, "Part 16: Air Interface for Broadband Wireless Access Systems", IEEE LAN/MAN Standards Committee (52 pages).

The EPO has prepared the Search Report of European patent application EP10845595 dated Jun. 13, 2013 (9 pages).

DRAFT Amendment to IEEE Standard for Local and Metropolitan Area Networks, Part 16: Air Interface for Fixed and Mobile Broadband Wireless Access Systems, IEEE P802.16m/D4-Feb. 2010, paragraph [16.3.6.5.2.4.5], paragraph [16.3.9.3.1], paragraph [16.3.9.4]—paragraph [16.3.9.4.1].

The EPO has prepared the Search Report of European patent application EP10845592 dated Jun. 21, 2013 (8 pages).

DRAFT Amendment to IEEE Standard for Local and Metropolitan Area Networks, Part 16: Air Interface for Fixed and Mobile Broadband Wireless Access Systems, IEEE P802.16m/D4-Feb. 2010, paragraph [16.3.6.3.2.3]—paragraph [16.3.6.3.2.4], paragraph [16.3.9.3.1], paragraph [16.3.9.4].

Text Proposal of PC-A-MAP IE Assignment in IEEE802.16 D1 (5.3.6.5.4.10), IEEE C802.16m-09/2072, Aug. 30, 2009, p. 2, p. 5, p. 7, p. 8.

\* cited by examiner

UPLINK POWER CONTROL MESSAGE INDEXING IN WIRELESS OFDMA SYSTEMS

CROSS REFERENCE TO RELATED APPLICATIONS

This application claims priority under 35 U.S.C. §119 from U.S. Provisional Application No. 61/303,719, entitled "Uplink Power Control Scheme in Wireless OFDMA System," filed on Feb. 12, 2010; the subject matter of which is incorporated herein by reference.

TECHNICAL FIELD

The disclosed embodiments relate generally to wireless network communications, and, more particularly, to power control message indexing in wireless orthogonal frequency division multiple access (OFDMA) communication systems.

BACKGROUND

In wireless orthogonal frequency division multiple access (OFDMA) communication systems, the transmit power of each mobile station needs to be maintained at a certain level to achieve desired channel quality and to maximize system capacity. Because radio resources in wireless OFDMA systems are partitioned into subcarriers within each radio frequency (RF) carrier, radio signals are transmitted from each mobile station to its serving base station in data streams using different subcarriers. As a result, the transmit power per data stream and per subcarrier for the current transmission depends on the target uplink signal to interference plus noise power ratio (SINR) received by the serving base station, and the noise and interference level per subcarrier at the serving base station. In a Close Loop Power Control (CLPC) mechanism, the transmit power of each mobile station is controlled by a Transmit Power Control (TPC) command transmitted from the serving base station. The serving base station periodically monitors uplink channel quality of the mobile stations, and in response, sends TPC commands for periodic transmit power update for the mobile stations.

Uplink channel quality of the mobile stations can be derived or estimated by the serving base station based on downlink channel measurements performed by the mobile stations. In Time Division Duplex (TDD) systems, uplink channel quality can be derived from downlink channel measurement due to channel reciprocity. In Frequency Division Duplex (FDD) systems, uplink channel quality can also be estimated from downlink channel measurement by exploiting channel correlation between downlink and uplink channels.

In one embodiment of an IEEE 802.16m system, the serving base station first configures the duration and periodicity of a fast feedback channel (FFBCH) for a mobile station. The mobile station then reports its downlink channel information via the configured FFBCH. The serving base station estimates the uplink channel quality, e.g., uplink SINR, based on the received FFBCH. In response to the estimated uplink channel quality, the serving base station detects a channel variation and then transmits a power control command to track the channel variation by delivering a power control A-MAP-IE inside the power control Advanced-MAP (PC-A-MAP) in a downlink frame. Based on the received PC-A-MAP-IE, the mobile station identifies the power control command and adjusts the transmit power level accordingly. When there are multiple mobile stations in the wireless OFDMA system, it is likely that multiple power control commands for multiple mobile stations will be aggregated within the same PC-A-MAP.

In order to identify its power control command inside the PC-A-MAP, a mobile station needs to know the address of the power control command, i.e., PC-A-MAP-IE inside the PC-A-MAP. However, it remains a challenge to provide a PC-A-MAP-IE indexing to the mobile stations for efficient and effective transmit power control.

SUMMARY

A method of power control message indexing is provided in a wireless Orthogonal Frequency Division Multiple Access (OFDMA) network. A serving base station configures uplink fast feedback channels (FFBCHs) via feedback allocation A-MAP-IE (FA-A-MAP-IE). The FA-A-MAP-IE includes the starting frame and subframe, as well as the duration and periodicity of FFBCHs that mobile stations can use for reporting downlink channel information. The mobile stations then report downlink channel information via the configured FFBCHs. The base station estimates the uplink channel quality, such as signal to interference plus noise power ratio (SINR) based on the received FFBCH for each mobile station. Based on the estimated channel quality information, the base station detects any channel variation and generates power control commands that deliver power offset values to adjust the transmit power levels of the mobile stations.

In one novel aspect, the power control commands for mobile stations are aggregated into one PC-A-MAP, and the indexing scheme is implicitly based on the configured FFBCHs. For example, if a FFBCH is located at a first location in an uplink frame, then a following PC-A-MAP-IE in response to the FFBCH is located at a second location in a downlink frame, the second location is located after the first location with a predefined fixed delay time. In one embodiment, if the total number of subframes in each frame is equal to N, then the delay time is predefined to be N/2 subframes.

By using a fixed time delay between a FFBCH and a corresponding PC-A-MAP-IE, each mobile station is able to identify its own power control command inside the PC-A-MAP transmitted from the base station without extra signaling overhead. In one advantageous aspect, the delay time may be predefined to be relatively short and independent from other parameters such as the periodicity of the FFBCH. Because the PC-A-MAP-IE closely follows the FFBCH with the predefined time delay, the power control commands will not be outdated because of rapidly changed channel condition. In addition, resource usages will not be wasted on mobile stations that are no longer connected to the base station.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
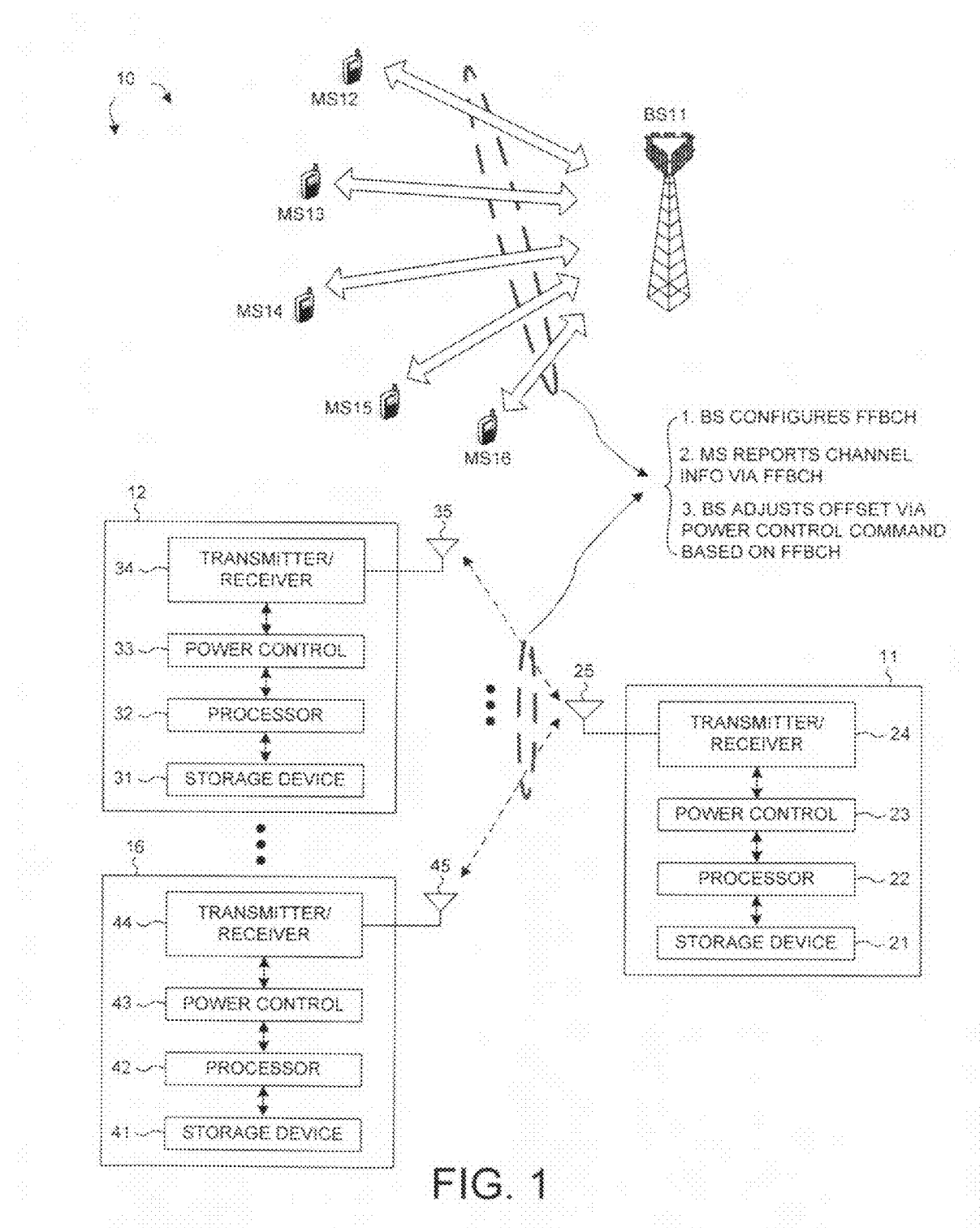
FIG. 1 illustrates a power control scheme in a wireless Orthogonal Frequency Division Multiple Access (OFDMA) system in accordance with one novel aspect.

FIG. 1 illustrates a transmit power control scheme in a wireless Orthogonal Frequency Division Multiple Access (OFDMA) system 10 in accordance with one novel aspect. Wireless OFDMA system 10 comprises a serving base station BS11 and a plurality of mobile stations MS12-MS16. Base station BS11 comprises memory 21, a processor 22, a power control module 23, and a transmitter and receiver 24 coupled to an antenna 25. Similarly, each mobile station (e.g., MS12) comprises memory 31, a processor 32, a power control module 33, and a transmitter and receiver 34 coupled to an antenna 35.

In wireless OFDMA system 10, it is desirable for each mobile station MS12-MS16 to transmit radio signals with a power level that is high enough to ensure proper signal reception at an intended receiver, and yet low enough to preserve energy and to prevent from causing interference to other unintended receivers. In addition, system capacity can be maximized by controlling the transmit power of each mobile station to achieve minimum required channel quality. In a Close Loop Power Control (CLPC) mechanism, the transmit power of each mobile station is controlled by a power control message transmitted from serving base station BS11. Serving base station BS11 periodically monitors uplink channel quality of each mobile station, and in response, sends Transmit Power Control (TPC) commands for periodic transmit power update for each mobile station. In Time Division Duplex (TDD) systems, uplink channel quality can be derived from downlink channel measurement due to channel reciprocity. In Frequency Division Duplex (FDD) systems, uplink channel quality can also be estimated from downlink channel measurement by exploiting channel correlation between downlink and uplink channels.

As illustrated in FIG. 1, serving base station BS11 first configures a fast feedback channel (FFBCH) via a feedback allocation Advanced-MAP information element (i.e., FA-A-MAP-IE, not shown). Each mobile station (e.g., MS15) then reports downlink channel information via the configured FFBCH. BS11 performs uplink channel estimation based on the received FFBCH and then transmits a power control command to track the channel variation by delivering a power control A-MAP information element (i.e., PC-A-MAP-IE, not shown) inside a PC-A-MAP. The PC-A-MAP may include aggregated PC-A-MAP-IEs delivered for multiple mobile stations. In one novel aspect, the power control command is designed based on the configured FFBCH such that each mobile station is able to efficiently and effectively identify the corresponding power control command to adjust its transmit power level.

Because radio resources in wireless OFDMA systems are partitioned into subcarriers within each RF carrier, radio signals are thus transmitted by each mobile station in a data stream using a specific subcarrier (e.g., a sub-channel). The transmit power of a particular channel is thus closely related to the channel quality. Currently, in advanced wireless OFDMA system (e.g., wireless OFDMA system 10 of FIG. 1), the power control formula of a mobile station (e.g., MS15) can be described as follows:

$$P = L + SINR_{TARGET} + NI + \text{Offset} \qquad (1)$$

where P is the transmit power level per data stream and per subcarrier for the current transmission, L is the estimated average downlink propagation loss calculated by the mobile station (e.g., MS15), $SINR_{TARGET}$ is the target uplink signal to interference plus noise power ratio received by the base station (e.g. BS11), NI is the estimated average power level of the noise and interference per subcarrier at the base station, and Offset is a correction term for power offset for the mobile station. The power offset is controlled by a power control command transmitted from the base station to the mobile station. The power control command can be periodically (e.g., close-loop power control) or non-periodically (e.g., open-loop power control) sent from the base station.

Figure 2:
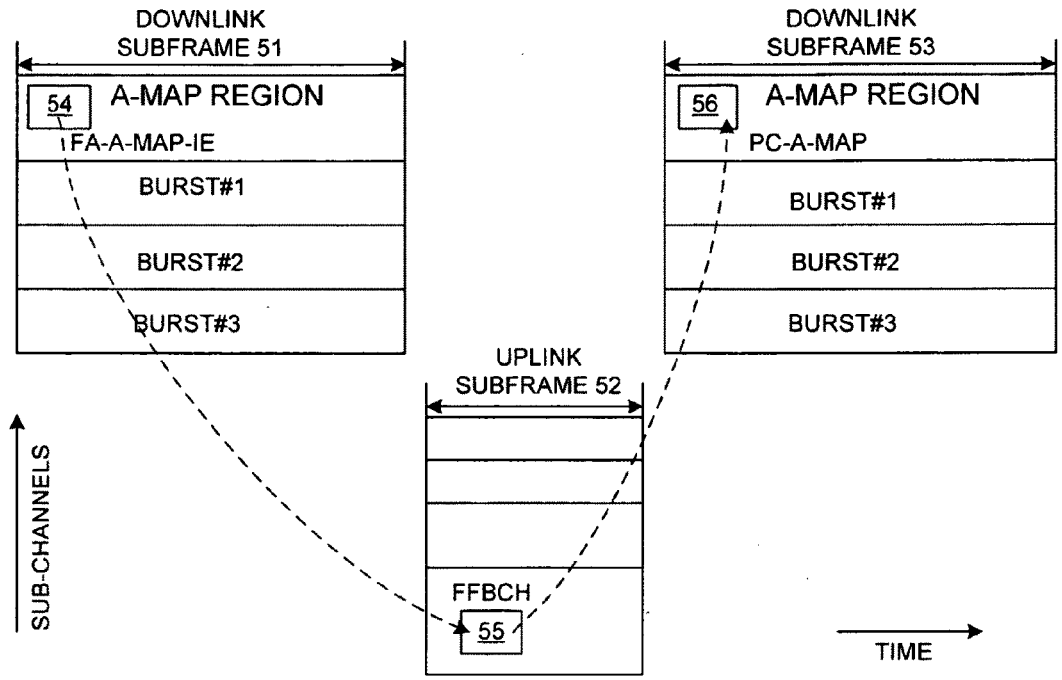
FIG. 2 is a diagram that illustrates a structure of a frame in accordance with a communication protocol employing a novel power control mechanism.

FIG. 2 is a diagram that illustrates a structure of a frame in accordance with a communication protocol employing the above-illustrated power control mechanism. The frame structure of FIG. 2 is not an actual frame structure, but rather is a simplified illustration presented here for instructional purposes. The frame in FIG. 2 includes downlink subframes 51, 53, and an uplink subframe 52. A downlink subframe is communicated from the base station to one or more mobile stations, and an uplink subframe is communicated from a mobile station back to the base station. As is known in the art, the units of the vertical axis represent various subcarriers (i.e., sub-channels) that may be used for communication. The horizontal axis represents time extending from left to right in time domain. The downlink subframe is therefore followed in time by the uplink subframe.

As illustrated in FIG. 2, inside the downlink subframe 51, a FA-A-MAP-IE 54 is included to configure a FFBCH 55 of the following uplink subframe 52. For example, the starting frame and subframe, as well as the duration and periodicity of FFBCH 55 are configured via FA-A-MAP-IE 54. Via the configured FFBCH 55, a mobile station is then able to report downlink channel information back to the base station. The base station then estimates the uplink channel quality, such as signal to interference plus noise power ratio (SINR) based on FFBCH. Based on the estimated uplink channel quality, the base station derives the power level of the uplink channel. The base station is then able to determine whether there is any channel variation and whether a power adjustment is needed in response to the channel variation. If a power adjustment is needed, then a power offset is delivered to the mobile station via a power control command.

There are two schemes used to deliver the power offset from the base station to the mobile stations. In a first scheme, an uplink power control adjustment message (AAI-UL-POWER-ADJ) is signaled as a downlink MAC control message to a specific mobile station. The AAI-UL-POWER-ADJ message is able to provide a large power jump to adapt to the detected channel variation quickly. In a second scheme, power control commands for multiple mobile stations are aggregated and delivered via a PC-A-MAP 56 in downlink subframe 53. Each mobile station then identifies the location of its own power control command inside PC-A-MAP 56. In contrast to the AAI-UL-POWER-ADJ message, PC-A-MAP 56 provides a small-scale power adjustment to the detected channel variation for each mobile station. In accordance with one novel aspect, each power control command inside PC-A-MAP 56 are implicitly indexed based on the previous FFBCH 55 that is already configured by the base station without additional signaling overhead. With the known power control message indexing scheme, each mobile station is then able to locate its own power control command and identify corresponding power offset for its transmit power level adjustment.

Figure 3:
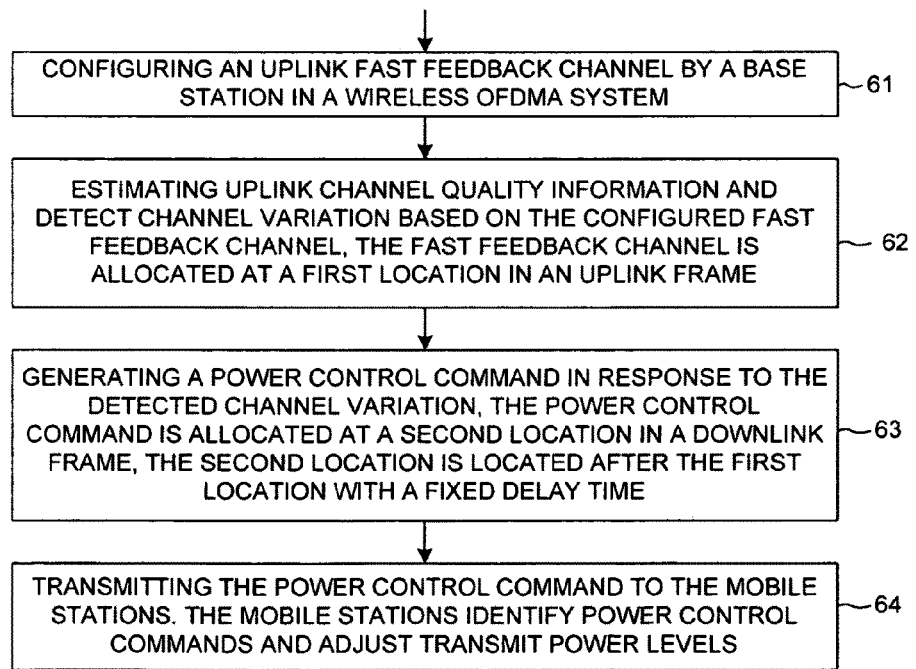
FIG. 3 is a flow chart of a method of power control message indexing in a wireless OFDMA system in accordance with one novel aspect.

FIG. 3 is a flow chart of a method of power control message indexing in a wireless OFDM system in accordance with one novel aspect. In step 61, a serving base station configures uplink fast feedback channels via FA-A-MAP-IE. The FA-A-MAP-IE includes the starting frame and subframe, as well as the duration and periodicity of FFBCHs that mobile stations can use for reporting downlink channel information. In step 62, the base station receives downlink channel information reported by the mobile stations via the configured FFBCHs. Based on the received FFBCHs, the base station estimates uplink channel quality and detects any channel variation. In step 63, based on the detected channel variation, the base station generates aggregated power control commands that deliver power offsets to adjust the transmit power levels of the mobile stations. In one advantageous aspect, the power control commands for mobile stations are aggregated into one PC-A-MAP, and the indexing scheme is implicitly based on the configured FFBCHs. For example, if a FFBCH is located at a first location in an uplink frame, then a following PC-A-MAP-IE in response to the FFBCH is located at a second location in a downlink frame, the second location is located after the first location with a fixed delay time. Finally, the step 64, the base station transmits the power control commands to the mobile stations. The mobile stations identify the power control commands inside the received PC-A-MAP and adjust their transmit power lever accordingly. Different embodiments and examples of the power control message indexing are now described below with accompanying drawings.

Figure 4:
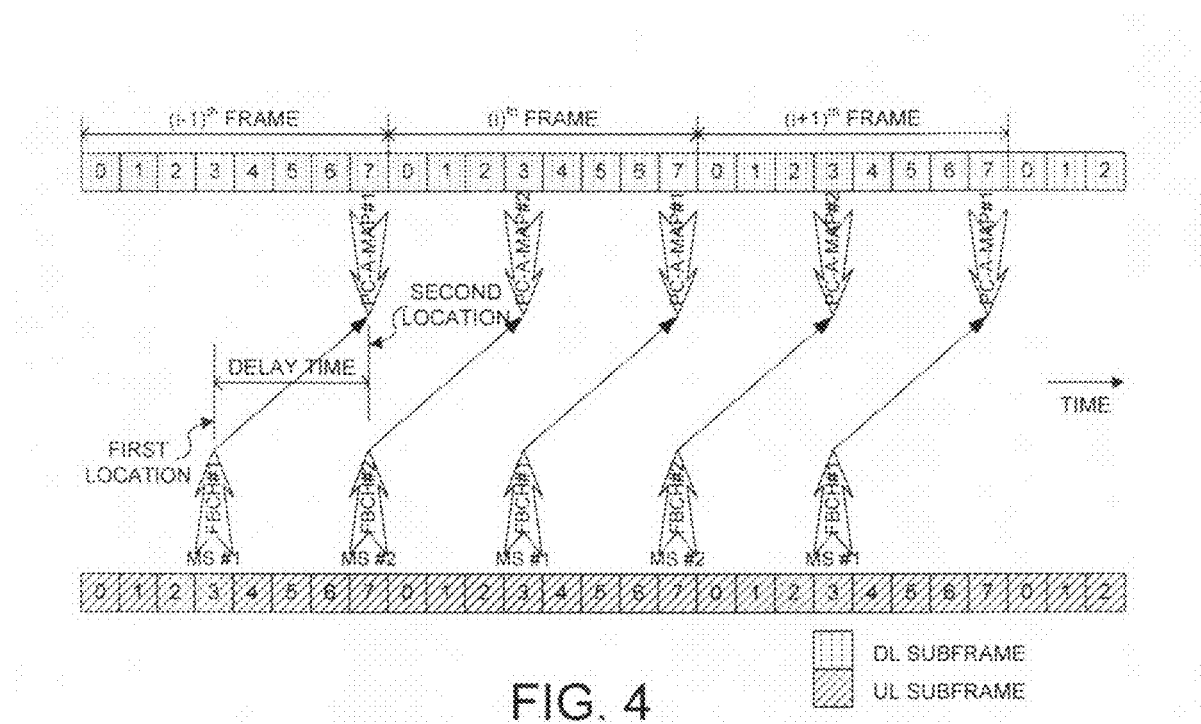
FIG. 4 illustrates one embodiment of power control message indexing in Frequency Division Duplex (FDD) systems.

FIG. 4 illustrates one embodiment of power control message indexing in Frequency Division Duplex (FDD) systems. In FDD systems, distinct frequency channels are used for uplink and downlink subframes. As a result, uplink and downlink subframes are transmitted at the same timeslots. As illustrated in FIG. 4, each downlink frame (e.g., $(i-1)^{th}$, $i^{th}$, and $(i+1)^{th}$ frame) includes eight subframes, each depicted as a dot-shaded block with an integer indicating its subframe number (e.g., 0-7). Similarly, each uplink frame includes eight subframes, each depicted as a slash-shaded block with an integer indicating its subframe number. For a first mobile station MS#1, the configured FFBCH#1 is located in subframe#3 and repeated in every uplink frame. For a second mobile station MS#2, the configured FFBCH#2 is located in subframe#7 and repeated in every uplink frame. In the example of FIG. 4, FFBCH#1 is located at a first location, and PC-A-MAP#1 in response to FFBCH#1 is located at a second location. FFBCH#1 is followed by PC-A-MAP#1 with a fixed delay time. Similarly, PC-A-MAP-IE#2 in response to FFBCH#2 is located after FFBCH#2 with the same fixed delay time. More specifically, the fixed delay time in FIG. 4 is equivalent to four subframes of time length. That is, PC-A-MAP IE #1 in response to FFBCH#1 is transmitted at subframe#7 of each downlink frame, while PC-A-MAP-IE#2 is transmitted at subframe#3 of each downlink frame.

Figure 5:
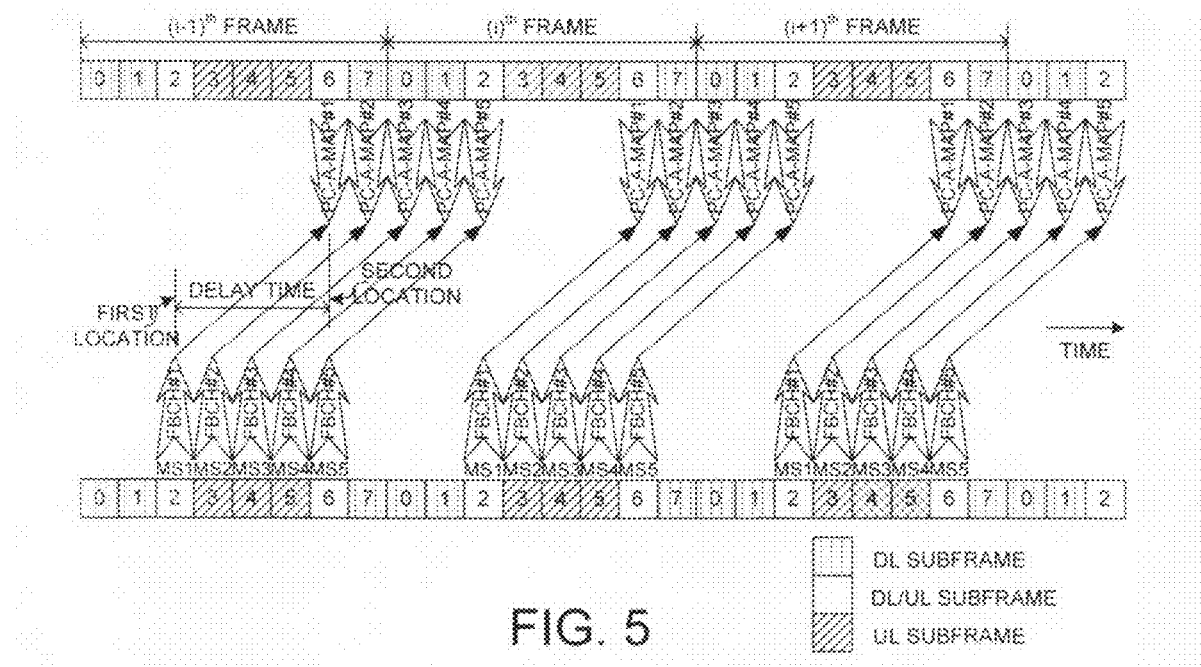
FIG. 5 illustrates one embodiment of power control message indexing in Hybrid Frequency Division Duplex (H-FDD) systems.

FIG. 5 illustrates another embodiment of power control message indexing in Hybrid Frequency Division Duplex (H-FDD) systems. In H-FDD systems, uplink and downlink subframes share the same RF circuitry in different subframes. As a result, uplink and downlink subframes are separated by dedicated timeslots. Unlike TDD systems, however, there are certain timeslots shared for both UL/DL subframes in H-FDD systems. As illustrated in FIG. 5, subframes 0-1, and 7 are dedicated for downlink transmission, subframes 3-5 are dedicated for uplink transmission, and subframes 2 and 6 are shared between uplink and downlink transmission. For a first mobile station MS#1, the configured FFBCH#1 is located in subframe#2 and repeated in every uplink frame. For a second mobile station MS#2, the configured FFBCH#2 is located in subframe#3 and repeated in every uplink frame, and so on so forth. In the example of FIG. 5, PC-A-MAP-IE#1 in response to FFBCH#1 is located after FFBCH#1 with a fixed delay time of four subframes. Therefore, PC-A-MAP-IE#1 is transmitted at subframe#6 of each downlink frame. Similarly, other PC-A-MAP-IEs in response to their corresponding FFBCHs are transmitted after the FFBCHs with the same fixed delay time.

In one example, the delay time may be predefined in the wireless OFDMA system. With a predefined delay time, once the mobile station knows the exact location of its configured FFBCH via FA-A-MAP-IE, the mobile station also knows the exact location of its corresponding power control message in PC-A-MAP without additional signaling requirement. In another example, however, the delay time may be separately signaled from the base station to the mobile stations.

Figures 6, 7:
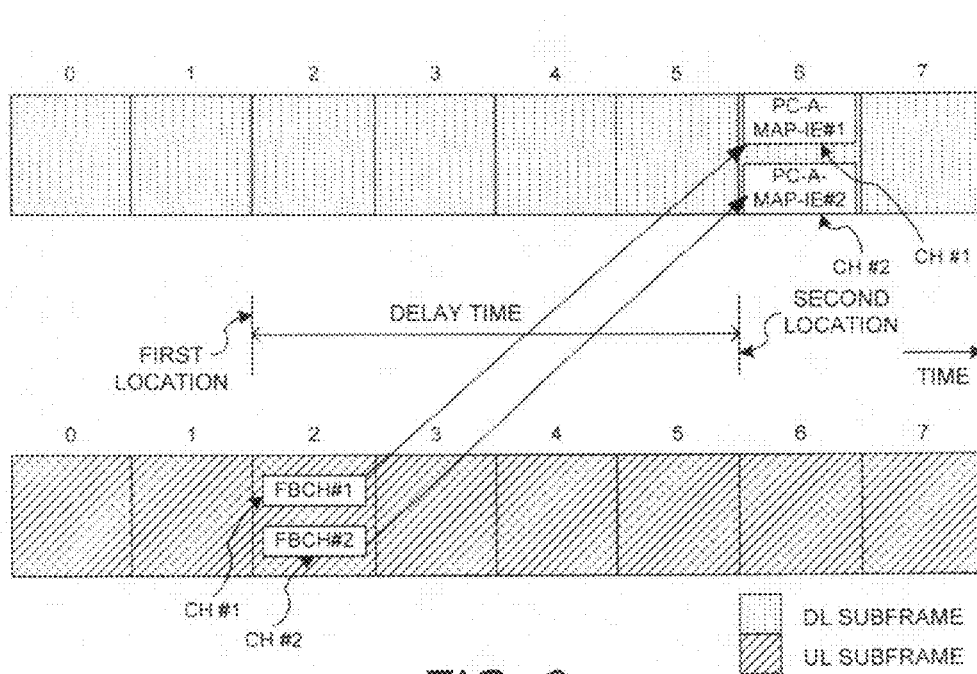
FIG. 6 illustrates another embodiment of power control message indexing in FDD/H-FDD systems.
FIG. 7 illustrates four examples of power control message indexing in a wireless OFDMA system.

In the above-illustrated examples of FIG. 4 and FIG. 5, the FFBCHs are allocated with different subframe indexes for each mobile station. As a result, different mobile stations transmit downlink channel information in different uplink subframes via the allocated FFBCHs. Consequently, PC-A-MAP-IEs are also transmitted in different downlink subframes to different mobile stations. In some other scenarios, however, the FFBCHs may be allocated with the same subframe index but with different frequency subcarriers indicated by different channel indexes. FIG. 6 illustrates such an example. In the example of FIG. 6, mobile station MS#1 transmits its downlink channel information in FFBCH#1, which is located in subframe#2 with channel index #1. On the other hand, mobile station MS#2 transmits its downlink channel information in FFBCH#2, which is also located in subframe#2, but with channel index #2. If the fixed time delay is equal to four subframes of time length, then PC-A-MAP-IE#1 in response to FFBCH#1 is transmitted in subframe#6 with channel index #1, while PC-A-MAP-IE#2 in response to FFBCH#2 is transmitted in subframe#6 with channel index #2. As a result, MS#1 and MS#2 is still able to locate the address of its own power control message and adjusts the transmit power level accordingly.

By using a fixed time delay between a FFBCH and a corresponding PC-A-MAP-IE, each mobile station is able to identify its own power control command inside the PC-A-MAP transmitted from the base station without extra signaling overhead. In one advantageous aspect, the delay time may be predefined to be relatively short and independent from other parameters such as the periodicity of the FFBCH. Because the PC-A-MAP-IE closely follows the FFBCH with the predefined time delay, the power control command will not be outdated because of changed channel condition. In addition, resource usages will not be wasted on mobile stations that are no longer connected to the base station if the delay time is too long. Moreover, in H-FDD systems, the delay time can be easily determined such that the PC-A-MAP-IE will be transmitted in dedicated uplink subframes without additional scheduling constraint. Different examples of power control message indexing are now described below with more details.

FIG. 7 illustrates four examples of power control message indexing in a wireless OFDMA system. As illustrate in table 100 of FIG. 7, the location of a FFBCH of a particular mobile station is associated with a frame index i, a subframe index m, and a channel index q. The location of a PC-A-MAP-IE in response to the FFBCH is associated with a frame index i', a subframe index m', and a channel index q'. In a first example#1, frame index i'=i+floor((m+x)/N), subframe index m'=(m+x) mod N, and channel index q'=q, where N is the number of subframes within each frame, and x is a positive integer indicating the number of subframes. In the above example, if a FFBCH occurs in a location associated with certain frame, subframe and channel indexes, then its corresponding PC-A-MAP-IE occurs at x subframes after the FFBCH. That means, whenever the mobile station reports its downlink channel information via a configured FFBCH to its serving base station, the serving base station estimates the uplink channel quality and responds with a corresponding power control command after a delay time of x subframes. The value of x is not tied to the periodicity of the FFBCH, but rather can be predefined to any desired time length.

In an Institute of Electrical and Electronics Engineers (IEEE) 802.16m compliant system, for regular radio signal bandwidth such as 5, 10, or 20 MHz, the total number of subframes per frame (N) is equal to eight. In one example, x may be predefined to be equal to N/2=four. With x equal to four, the delay time is predefined to be half of a frame length. If the periodicity of the FFBCH is also equal to eight subframes, then the PC-A-MAP-IE falls in the middle of two consecutive FFBCHs.

In a second example#2, frame index i'=i+floor((m+x)/N), subframe index m'=(m+floor(x)) mod N, and channel index q'=q, where N is the number of subframes within each frame, and x is a number indicating the number of subframes. In this example, if a FFBCH occurs in a location associated with certain frame, subframe and channel indexes, then its corresponding PC-A-MAP-IE occurs at floor(x) subframes after the FFBCH. The operation floor(x) is applied here in the case that x is not an integer, but any decimal number. For wireless systems with non-regular radio signal bandwidth of 7 MHz, the total number of subframes per frame N is equal to five. In one example, x is predefined to be equal to N/2=2.5, and the delay time floor(x) is equal to two subframes. Similarly, for wireless systems with non-regular radio signal bandwidth of 8.75 MHz, the total number of subframes per frame N is equal to seven. In one example, x is predefined to be equal to N/2=3.5, and the delay time floor(x) is equal to three subframes.

In a third example #3, frame index i'=i+floor((m+floor(x))/N), subframe index m'=(m+floor(x)) mod N, and channel index q'=q, where N is the number of subframes within each frame, and x is a number indicating the number of subframes. Example#3 is very similar to example#2, the only difference is that floor(x) is applied in calculating frame index i'.

In a fourth example #4, frame index i'=i+1, subframe index m'=floor(s/T) mod N, and channel index q'=s mod T, where N is the number of subframes within each frame, s is defined as s=Q*m+q where Q is the total number of FFBCH in an uplink subframe given by Q=Nfb*UL_FEEDBACK_SZIE-LHFB/3 where Nfb is 3 in Mzone and 4 in Lzone with PUSC, and LHFB is the number of UL HARQ channels defined in S-SFH SP1, T is the total number of PC-A-MAP IE in downlink subframe and is calculated as T=ceil(U*Q/D) where U and D are the number of uplink and downlink subframes carrying PC-A-MAP and FFBCH, respectively, per frame. In FDD systems, the values of U and D are the same.

Although the present invention has been described in connection with certain specific embodiments for instructional purposes, the present invention is not limited thereto. For example, although the power control message indexing is illustrated in FDD and H-FDD wireless systems, it may be applied to TDD systems as well. Accordingly, various modifications, adaptations, and combinations of various features of the described embodiments can be practiced without departing from the scope of the invention as set forth in the claims.

What is claimed is:

1. A method, comprising:
  estimating uplink channel quality based on a fast feedback channel transmitted by a mobile station in a wireless OFDMA system, wherein the fast feedback channel is allocated at a first location in an uplink subframe; and
  transmitting a power control message by a base station to the mobile station, wherein the power control message is transmitted in response to the estimated uplink channel information and is allocated at a second location in a downlink subframe, wherein the second location is located after the first location with a delay time, wherein the first location is associated with a first frame index, a first subframe index, and a first channel index, wherein the second location is associated with a second frame index, a second subframe index, and a second channel index, and wherein the second frame index, the second subframe index, and the second channel index are determined based on the first frame index, the first subframe index, the first channel index, and the delay time.

2. The method of claim 1, wherein the delay time is predefined in the wireless OFDMA system.

3. The method of claim 1, wherein the delay time is independently signaled from the base station to the mobile station.

4. The method of claim 1, wherein each frame contains N unit of subframes, wherein the delay time equals to X unit of subframes along time domain, and wherein N is a positive integer while X is a decimal number.

5. The method of claim 1, wherein the power control message comprises a power offset for adjusting the uplink transmitting power of the mobile station.

6. The method of claim 1, wherein the wireless OFDMA system is either a frequency division duplex (FDD) system or a hybrid frequency division duplex (H-FDD) system.

7. A base station, comprising:
  a receiver that estimates uplink channel quality based on a fast feedback channel transmitted by a mobile station in a wireless OFDMA system, wherein the fast feedback channel is allocated at a first location in an uplink subframe;
  a power control module that generates a power control message in response to the estimated uplink channel information; and
  a transmitter that transmits the power control message to the mobile station, wherein the power control message is allocated at a second location in a downlink subframe, wherein the second location is located after the first location with a delay time, wherein the first location is associated with a first frame index, a first subframe index, and a first channel index, wherein the second location is associated with a second frame index, a second subframe index, and a second channel index, and wherein the second frame index, the second subframe index, and the second channel index are determined based on the first frame index, the first subframe index, the first channel index, and the delay time.

8. The base station of claim 7, wherein the delay time is predefined in the wireless OFDMA system.

9. The base station of claim 7, wherein the delay time is independently signaled from the base station to the mobile station.

10. The base station of claim 7, wherein each frame contains N unit of subframes, wherein the delay time equals to X unit of subframes along time domain, and wherein N is a positive integers while X is a decimal number.

11. The base station of claim 7, wherein the power control message comprises a power offset for adjusting the uplink transmitting power of the mobile station.

12. The base station of claim 7, wherein the wireless OFDMA system is either a frequency division duplex (FDD) system or a hybrid frequency division duplex (H-FDD) system.

13. A method, comprising:
receiving downlink channel information via a plurality of fast feedback channels transmitted by a plurality of mobile stations in a wireless OFDMA system;
estimating uplink channel quality based on the received fast feedback channels by a base station in the wireless OFDMA system; and
transmitting a plurality of power control messages in response to the estimated uplink channel responses by the base station to the plurality of mobile stations, wherein each power control message is allocated at a second location with respect to each fast feedback channel that is allocated at a first location, wherein the first location is associated with a first frame index, a first subframe index, and a first channel index, wherein the second location is associated with a second frame index, a second subframe index, and a second channel index, and wherein the second frame index, the second subframe index, and the second channel index are determined based on the first frame index, the first subframe index, the first channel index, and a delay time.

14. The method of claim 13, wherein each frame contains N unit of subframes, wherein the delay time equals to X unit of subframes along time domain, and wherein N is a positive integer while X is a decimal number.

15. The method of claim 13, wherein each fast feedback channel is transmitted every P unit of subframes along time domain, wherein P is a positive integer, and wherein the delay time is unrelated to the value of P.

16. The method of claim 15, wherein the delay time is substantially shorter than the periodicity of each fast feedback channel.

17. The method of claim 15, wherein the delay time is predefined such that the power control message is allocated in downlink subframe in a hybrid frequency division duplex (H-FDD) system.

18. The method of claim 13, wherein each power control message comprises a power offset for adjusting the uplink transmitting power of the plurality of mobile stations.

\* \* \* \* \*